United States Patent [19]

Kaplow et al.

[11] 4,232,731
[45] Nov. 11, 1980

[54] PASSIVE SOLAR DEVICE FOR HEATING AND COOLING

[75] Inventors: Roy Kaplow, Newton; Marvin C. Lewis, Boston, both of Mass.

[73] Assignee: General Solar Energy Corporation, Boston, Mass.

[21] Appl. No.: 919,863

[22] Filed: Jun. 28, 1978

[51] Int. Cl.³ .......................................... F25B 29/00
[52] U.S. Cl. ............................. 165/48 S; 165/104 S; 126/430; 126/901
[58] Field of Search ............ 165/DIG. 6, 48 S, 104 S; 237/1 A; 126/400, 270, 271, 424

[56] References Cited

U.S. PATENT DOCUMENTS

| | | | |
|---|---|---|---|
| 2,595,905 | 5/1952 | Telkes | 126/270 |
| 3,219,104 | 11/1965 | Walker | 165/DIG. 6 |
| 3,960,205 | 6/1976 | Laing | 165/48 |
| 4,002,159 | 1/1977 | Angilletta | 126/270 |
| 4,014,313 | 3/1977 | Pedersen | 126/270 |
| 4,088,547 | 5/1978 | Albertson | 126/270 |
| 4,090,497 | 5/1978 | Kelly | 126/271 |
| 4,092,977 | 6/1978 | Gurtler et al. | 126/270 |
| 4,122,239 | 10/1978 | Riboulet et al. | 126/270 |
| 4,143,640 | 3/1979 | Pierce | 126/270 |
| 4,144,931 | 3/1979 | Medico | 165/48 S |

Primary Examiner—Albert W. Davis
Assistant Examiner—Margaret A. Focarino
Attorney, Agent, or Firm—Morse, Altman, Oates & Bello

[57] ABSTRACT

A thermal control and storage unit, in the general form of a Venetian blind for location at windows and the like, comprises vanes of polygonal cross-section, having facets that selectively control radiative and other heat transfer in different orientations and that define compartments containing a phase transformation energy storage medium for solar energy conversion.

20 Claims, 12 Drawing Figures

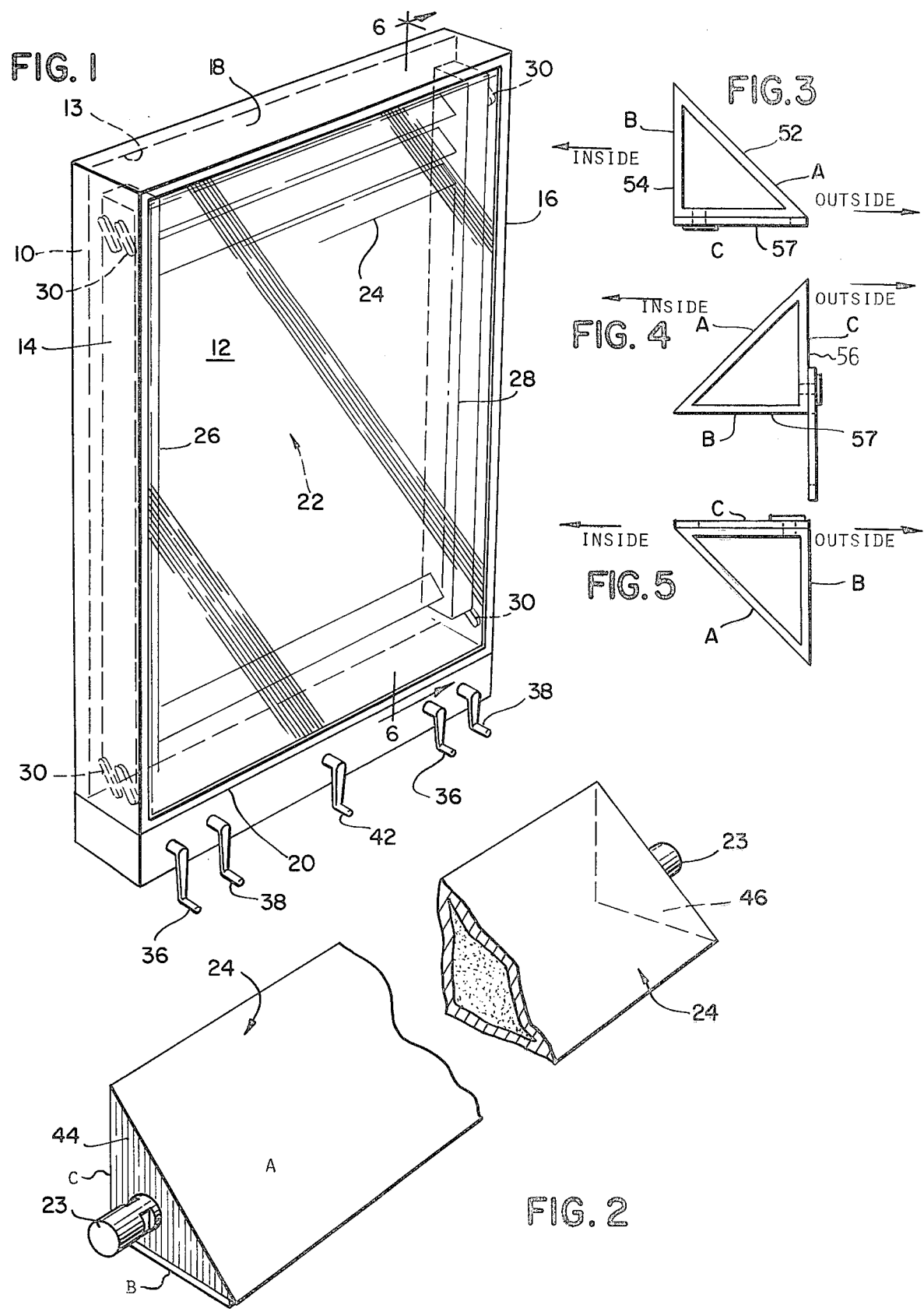

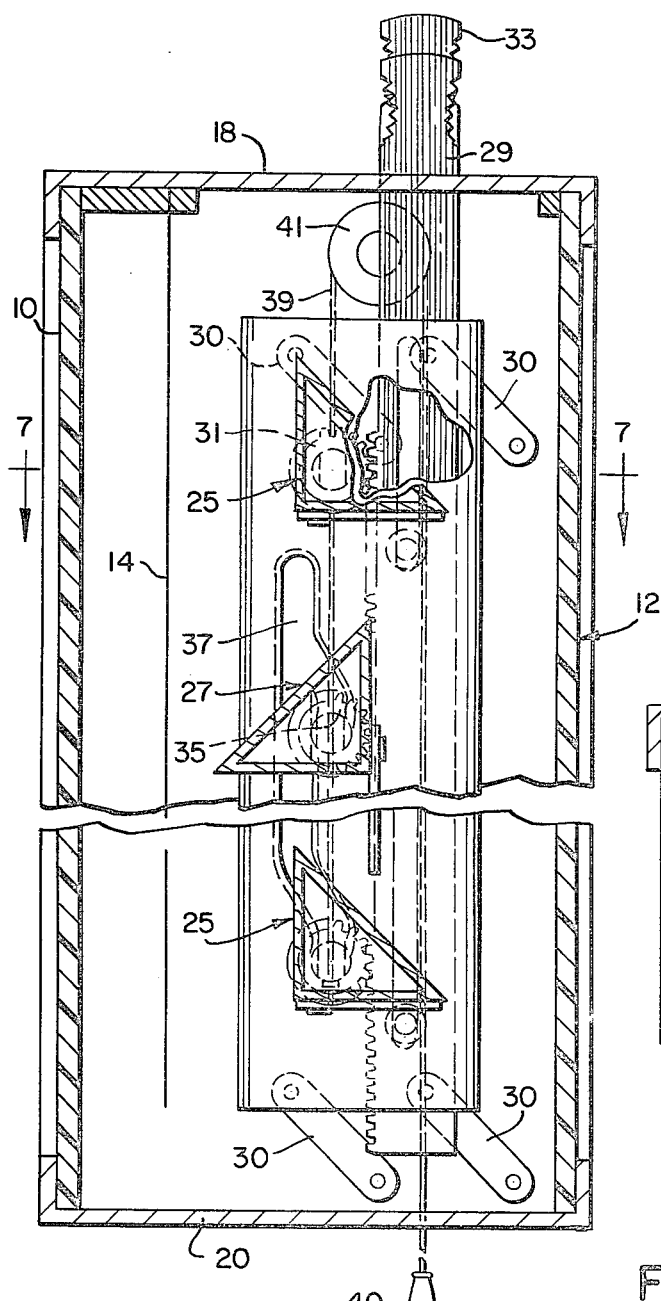
FIG. 6
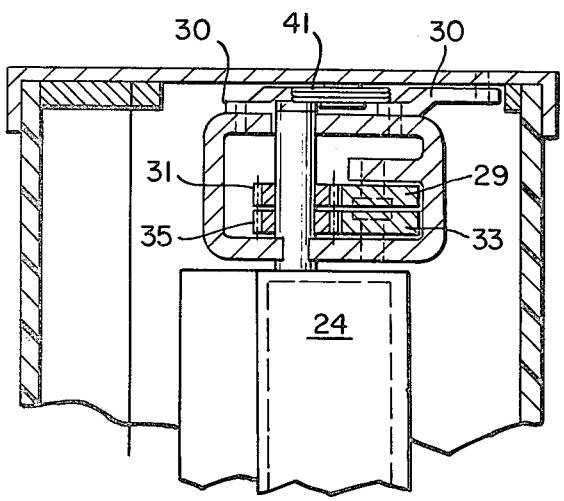
FIG. 7
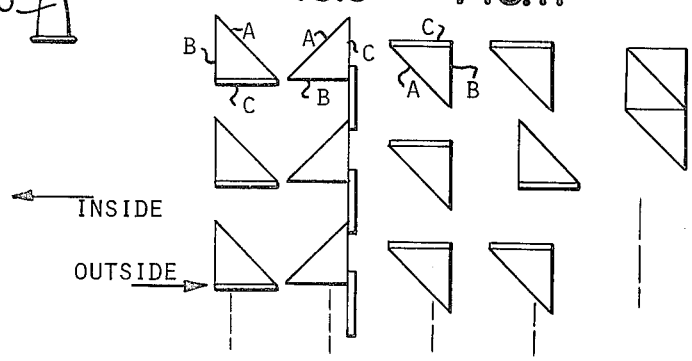
FIG. 8  FIG. 9  FIG. 10  FIG. 11  FIG. 12

PASSIVE SOLAR DEVICE FOR HEATING AND COOLING

BACKGROUND OF THE INVENTION

1. Field of the Invention

The present invention relates to energy transfer and storage and, more particularly, to solar energy control and conversion.

2. The Prior Art

There have been various proposals for controlling and using solar energy. Thus, sheets of partially reflectorized polymeric film have been laminated to window panes in order to attenuate incident solar radiation while permitting transfer of visible light into building interiors. Also, phase transformation media have been positioned at various locations for converting incident solar radiation to stored energy. And Venetian-blind-type configurations at windows and the like have combined solar radiation control and heat exchange media for transfer of stored energy to remote storage locations. More versatile and practicable structures are desired for local association with windows and the like.

SUMMARY OF THE INVENTION

The primary object of the present invention is to provide a thermal transfer and storage unit, in the general form of a Venetian blind for location at a window or the like, comprising vanes of particular construction that are adjustable between retracted and extended arrays at which they respectively permit unobstructed light transfer through the window and enable solar radiation control and storage. Each vane is substantially of polygonal cross-section, having facets that selectively control radiative transfer in different orientations and that define compartments containing a eutectic or other heat storage medium for solar energy conversion.

Other objects of the present invention will in part be obvious and will in part appear hereinafter.

BRIEF DESCRIPTION OF THE DRAWINGS

For a fuller understanding of the nature and objects of the present invention, reference is made to the following detailed description, which is to be taken in connection with the accompanying drawings, wherein:

FIG. 1 is a perspective view of a solar control and storage unit with its vanes extended, embodying the present invention;

FIG. 2 is a broken-away view of a vane embodying the present invention;

FIG. 3 is a cross-sectional view of the vane of FIG. 2 in a first operating mode;

FIG. 4 is a cross-sectional view of the vane of FIG. 2 in a second operating mode;

FIG. 5 is a cross-sectional view of the vane of FIG. 2 in a third operating mode;

FIG. 6 is a broken-away cross-section of the solar control and storage unit of FIG. 1, taken along the line 6—6 of FIG. 1;

FIG. 7 is a broken-away cross-section of the solar control and storage unit of FIG. 1, taken along the line 7—7 of FIG. 6;

FIG. 8 is a diagrammatic showing of relationships among the components;

FIG. 9 is a diagrammatic showing of other relationships among the components;

FIG. 10 is a diagrammatic showing of other relationships among the components;

FIG. 11 is a diagrammatic showing of other relationships among the components; and FIG. 12 is a diagrammatic showing of other relationships among the components.

DETAILED DESCRIPTION OF THE PREFERRED EMBODIMENT

The solar control and storage unit of FIG. 1 generally comprises spaced front and rear clear glass panes 10, 12, which are mounted at their vertical edges by a pair of vertical aluminum channels 14, 16. These elements, together with a pair of top and bottom caps 18, 20, define a hermetic compartment 22, within which the remainder of the operating components are mounted and contained. These operating components include a plurality of vanes 24, each of which is triangular in cross-section, as shown in FIG. 2. Compartment 22 contains a gas, such as krypton, which provides a good thermal insulating capability at atmospheric pressure. Positioned between vanes 24 and glass pane 10 is thin clear plastic film 13, composed, for example, of polyethylene terephthalate, the edges of which are fastened to channels 14, 16 and caps 18, 20 in order to limit convection of the inert gas.

Vanes 24 are gimbaled at their opposite ends to a pair of opposed mounting plates 26, 28 by opposed rods 23, 23. These plates are constrained for parallel motion toward and from glass pane 12 by a series of parallel links 30, which are connected between the mounting plates and channels 14, 16. As shown in FIGS. 6 and 7, alternate sets of vanes are controllable separately. The rotational orientation of odd numbered vanes 25 is controlled by operation of a pair of vertical racks, one shown at 29, which are mounted for reciprocal movement on plates 26, 28 and which mesh with respective pinions 31 that are keyed to respective rods 23. The rotational orientation of even numbered vanes 27 is controlled by operation of a pair of vertical racks, one shown at 33, which are mounted for reciprocal movement on plates 26, 28 and which mesh with respective pinions 35 that are keyed to respective rods 23. Respective rods 23, during normal operation, are journaled at the lower extremities of a series of respective slots 37, which are provided in plates 26, 28. When at lower extremities of these slots, the positions of the rods are such that respective pinions 31 are in mesh with respective racks 29 and such that respective pinions 35 are in mesh with respective racks 33. Under the control of a pair of cord and pulley mechanisms 39, 41 mounted on plates 26, 28, respective rods 23 are movable into the upper portions of respective slots 37, at which respective pinions 31 are disengaged from respective racks 29 and respective pinions 35 are disengaged from respective racks 33. By joint operation of cable and pulley mechanisms 39, 41, vanes 24 can be lowered to form an extended array or raised to form a retracted array in a manner to be described below. Manual cranks 36, 36 and 38, 38, which are operatively connected respectively to racks 29, 33, control the orientations of the odd and even numbered vanes. A pair of manual pulls, one shown at 40, control the raising and lowering of the odd and even numbered vanes jointly. A manual crank 42, which is operatively connected to mounting plates 26, 29, moves the vanes into and out of contact with glass pane 12. The functions of the aforementioned mechanisms will become more fully understood in connection with the following explanation of the structure, function, and operation of vanes 24.

As shown in FIG. 2, each vane 24 is a hollow elongated aluminum extrusion of triangular inner and outer cross-section. The ends of each vane are closed hermetically by caps 44, 46, from which extend pins 23, 23 along an axis about which the vanes are gimbaled for rotation. Typically, the thickness of the walls of each vane ranges between 2 and 10 mils, preferably being approximately 4 mils. Contained within the compartment of each vane is a phase transformation, energy storage medium, having an operative transformation (e.g. melting) point ranging between 70° and 130° F. and, preferably, between 70° and 90° F. Typical media include, for example, eutectic salt mixtures, as well as other materials. Of the former, for example, a mixture of sodium sulfate decahydrate ($Na_2SO_1.10H_2O$) with an appropriate proportion of potassium nitrate ($KNO_3$) has a eutectic melting point in the range of 70° to 75° F. Alternatively, for example: diphenyl oxide ($C_{12}H_{10}O$) has a melting point of 80.3° F.; and calcium chloride hexahydrate ($CaCl_2.6H_2O$) has a melting point of 81° F. In one form, the interior walls of the vanes are coated with an epoxy resin for corrosion resistance.

The facets of vane 24 are designated A, B, and C, which are provided respectively with selected surfaces 52, 54, and 56. Preferably, the angle between facets A and B is approximately 30°, the angle between facets A and C is approximately 60°, and the angle between facets B and C is approximately 90°. Surface 52 of facet A is characterized by relatively high absorptivity for sunlight, i.e., $\alpha > 0.75$, and relatively low emissivity for infrared, i.e., $\epsilon < 0.25$, being a coating composed, for example, of nickel oxide or chromium oxide, which achieve $\alpha/\epsilon$ ratios of as high as 0.95/0.05. Surface 54 of facet B is characterized by relatively high level absorptivity for infrared radiation at room temperature, i.e., $\alpha_{IR} > 0.75$, and relatively high emissivity at room temperature, i.e., $\epsilon_{IR} > 0.75$, being a coating composed, for example, of a black lacquer such as carbon particles dispersed in a linseed oil vehicle. Surface 56 of facet C is characterized by high specular reflectivity, i.e., $\rho > 0.75$, being composed, for example, of highly polished aluminum flanges 57 that are characterized by polished specularly reflecting surfaces. Each flange 57 slides under gravity between an extended position at which it blocks the gap between adjacent vanes and a retracted position at which it is superposed on surface 56.

When lowered into their extended array, vanes 24 operate in three modes.

Mode I is selected on cold days to absorb and store solar energy during sunlit periods and to direct infrared radiation indoors. The transfer of heat to the interior continues during sunless periods as long as the temperature of the storage medium remains above the indoor ambient temperature. In Mode I, as shown in FIG. 3, the vanes are adjusted so that facets A are disposed in oblique parallel planes facing toward the sun; and facets B are disposed vertically in a common plane in intimate mechanical contact with glass pane 12. The operation is such that solar radiation is transmitted through glass pane 10 for absorption by facet A and conversion to stored heat capacity and transformation energy by the storage medium within the panel. In consequence, the storage medium is maintained at its eutectic or melting temperature until it has reached its heat storage capacity and it continues to maintain facet B and glass pane 12 at the eutectic or melting temperature until the stored energy is exhausted at night, as well as during other periods in which there is no incident sunlight. In effect, glass pane 12 provides a large radiating surface tending to establish a comfortable thermal equilibrium with respect to persons indoors.

Mode II is selected on hot days to exclude sunlight and to cool the indoors. In Mode II, as shown in FIG. 4, the vanes are adjusted so that facets C are disposed vertically, with their flanges extended to present a specularly reflecting plane to incident sunlight; and facets A are disposed in oblique parallel planes that communicate through glass pane 12 with the indoors. The operation is such that solar radiation incident through glass pane 10 is returned through panel 10 by specular reflection from facets C and their flanges. In effect, the vanes shield the interior from incident solar radiation, thereby preventing undesired solar heating of the interior. In a preferred embodiment, the eutectic or melting temperature of the storage medium is chosen so that, when the interior temperature is high, heat is transferred from the interior to the storage medium by conduction through glass pane 12 and radiation from glass pane 12 to facets A and thence to facets B of the adjacent vanes. Thus, in Mode II, absorption of heat by the storage medium is capable of having a cooling effect on the indoors until the capacity of the storage medium is reached, i.e., while the eutectic or melting temperature of the storage medium is maintained.

Mode III is selected during evenings and at other times when outdoor temperature has dropped below storage medium temperature following operation in Mode II. In Mode III, as shown in FIG. 5, the vanes are adjusted so that facets B are disposed vertically in a common plane. Under these conditions, heat is transmitted by radiation and conduction to glass pane 10, which provides a large radiating surface tending to discharge undesired heat from the storage medium to the outdoors.

EXAMPLE I

In one form of the illustrated embodiment of the present invention, the coating of facet A is composed of chromium oxide and the storage medium is composed of sodium sulfate decahydrate-potassium nitrate. In this case, the eutectic temperature is ~73° F.

EXAMPLE II

In another form of the illustrated embodiment of the present invention, the coating of facet A is composed of a multilayer selective coating and the storage medium is composed of diphenyl oxide. In this case, the eutectic temperature is ~80° F.

Operation

When vanes 24 are not to be in use, they are removed from contact with inner pane 12 by operation of crank 42, rotated into nesting orientations, as shown in FIG. 11, by cranks 36, 38, and raised to nesting relation, as shown in FIG. 12, in a retracted array by cord 40. Now most of the area of the unit of FIG. 1 is free for transmission of light through pane 10, film 13, and pane 12. When vanes 24 are to be operated in Mode I, they are lowered into an extended array by cord 40, rotated into operative orientation, as shown in FIG. 8, by cranks 36, 38, and moved into contact with pane 12 by crank 42. Now solar radiation is received by facets A for energy storage, heat is conducted from facets B to pane 12, infrared radiation is emitted to the interior from pane 12, and partial visibility between the vanes is possible. When vanes 24 are to be operated in Mode II, they are moved out of contact with pane 12 by crank 42 and rotated into operative orientation, as shown in FIG. 9, by cranks 36, 38. Now solar radiation is reflected by facets C and by their flanges and heat is absorbed by the storage medium in the vanes from the indoors. When vanes 24 are to be operated in Mode III, they are rotated into operative orientation, as shown in FIG. 10, by cranks 36, 38. Now heat is emitted by the storage medium in the vanes to the outdoors. Thus, operation of the vanes contributes to the establishment of a comfortable heat exchange equilibrium in the space with which it communicates.

What is claimed is:

1. A solar control and storage unit for location at windows and the like, said unit comprising:
    (a) means including a pair of generally parallel transparent panes defining a hermetic compartment, said panes being composed of glass;
    (b) a gas which provides a good insulating capability within said compartment at substantially atmospheric pressure;
    (c) a plurality of elongated, generally parallel vanes mounted in said compartment generally parallel to said panes;
    (d) each of said vanes presenting at least three external facets and an internal compartment;
    (e) a first of said external facets being characterized by relatively high absorptivity with respect to solar radiation and relatively low emissivity with respect to infrared radiation at an operating temperature;
    (f) a second of said external facets being characterized by relatively high absorptivity and relatively high emissivity with respect to infrared radiation at said operating temperature;
    (g) a third of said external facets being characterized by relatively high specular reflectivity with respect to solar radiation;
    (h) a phase transformation energy storage medium within said internal compartment, said phase transformation occurring at said operating temperature; and
    (i) means for adjusting said vanes for operation in at least a first mode, a second mode, and a third mode, said first of said facets facing outdoors and said second of said facets facing indoors in said first mode, said third of said facets facing outdoors and said first of said facets facing outdoors and said first of said facets facing indoors in said second mode, said second of said facets facing outdoors and said first of said facets facing indoors in said third mode.

2. The solar control and storage unit of claim 1 wherein said operating temperature ranges between 70° and 130° F.

3. The solar control and storage unit of claim 1 wherein said operating temperature ranges between 70° and 90° F.

4. The solar control and storage unit of claim 1 wherein said operating temperature is the phase transformation temperature of said storage medium.

5. The solar control and storage unit of claim 1 wherein said vanes are composed substantially of aluminum.

6. The solar control and storage unit of claim 1 wherein said one of said facets is composed of a member of the class consisting of nickel oxide.

7. The solar control and storage unit of claim 1 wherein said other of said facets is composed of a black coating.

8. The solar control and storage unit of claim 1 wherein said absorptivity of said one of said facets is such that $\alpha_{IR} > 0.75$ and said emissivity of said one of said facets is such that $\epsilon_{IR} < 0.25$.

9. The thermal control and storage unit of claim 1 wherein said emissivity and said absorptivity of said other of said facets is such that $\epsilon_{IR} > 0.85$ and $\alpha_{IR} > 0.85$.

10. The thermal control and storage unit of claim 1 comprising means for moving said vanes into and out of contact with at least one of said panes.

11. The solar control and storage unit of claim 1 wherein said absorptivity of said one of said facets is such that $\alpha_{IR} > 0.75$ and said emissivity of said one of said facets is such that $\epsilon_{IR} < 0.25$, and said emissivity and said absorptivity of said other of said facets is such that $\epsilon_{IR} > 0.85$ and $\alpha_{IR} > 0.85$.

12. A solar control and storage unit for location at windows and the like, said unit comprising:
    (a) means defining a mount;
    (b) an array of elongated, generally parallel vanes carried by said mount;
    (c) each of said vanes presenting at least three external facets and having an internal compartment;
    (d) a first of said external facets being characterized by relatively high absorptivity with respect to solar radiation;
    (e) a second of said external facets being characterized by relatively high emissivity with respect to infrared radiation;
    (f) a third of said external facets being characterized by relatively high specular reflectivity with respect to said solar radiation;
    (g) a phase transformation energy storage medium within said internal compartment, said phase transformation occurring at an operating temperature; and
    (h) means for adjusting said vanes for operation in at least a first mode, a second mode, and a third mode for selectively absorbing said solar radiation and emitting said infrared radiation.

13. The solar control and storage unit of claim 12 wherein said operating temperature ranges between 70° and 130° F.

14. The solar control and storage unit of claim 12 wherein said operating temperature ranges between 70° and 90° F.

15. The solar control and storage unit of claim 12 wherein said operating temperature is the phase transformation temperature of said storage medium.

16. The solar control and storage unit of claim 12 wherein said vanes are composed substantially of aluminum.

17. The solar control and storage unit of class 12 wherein one of said facets is composed of nickel oxide.

18. The solar control and storage unit of claim 12 wherein one of said facets is composed of a black coating.

19. The solar control and storage unit of claim 12 wherein the emissivity of one of said facets is such that $\epsilon_{IR} < 0.25$.

20. The thermal control and storage unit of claim 12 wherein the absorptivity of one said facets is such that $\alpha_{IR} > 0.85$.

* * * * *